Patented Sept. 1, 1942

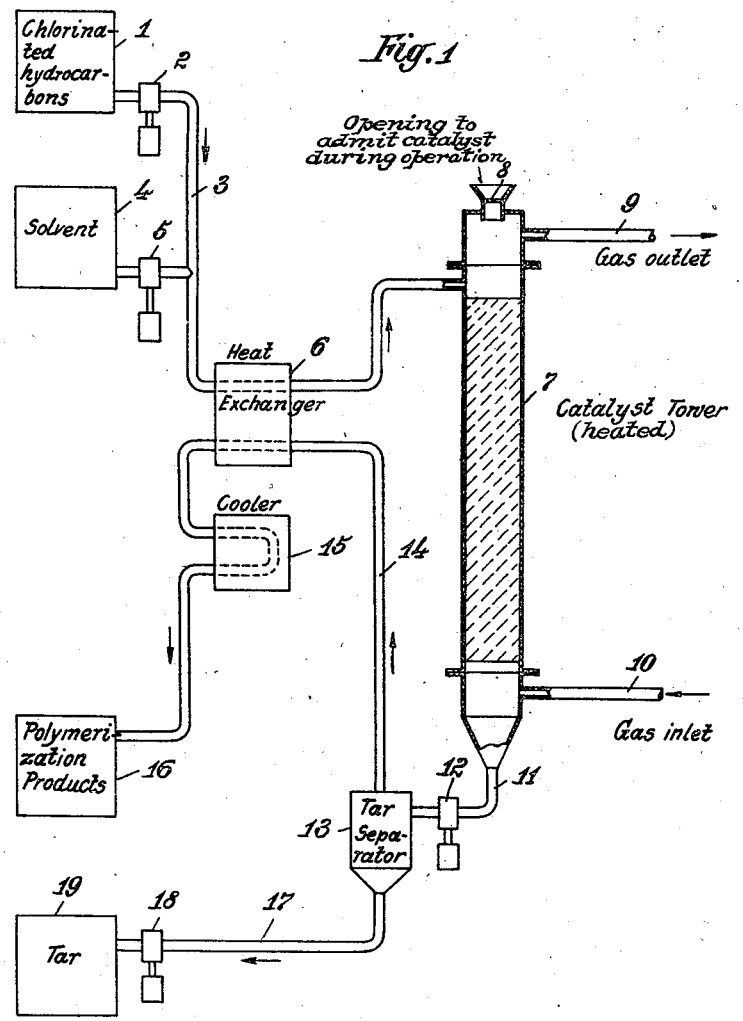

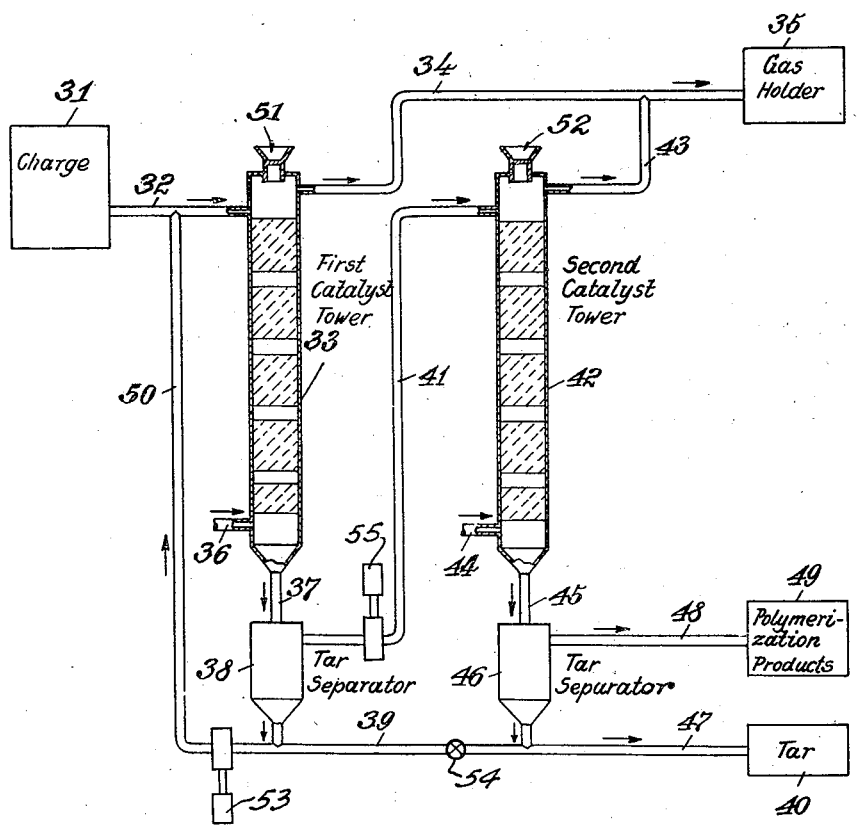

2,294,699

UNITED STATES PATENT OFFICE 2,294,699

PRODUCTION OF POLYMERIZATION AND CONDENSATION PRODUCTS FROM CHLORINATED HYDROCARBONS

Erich Steffen, Berlin, Germany, vested in the Alien Property Custodian

Application June 28, 1939, Serial No. 281,758
In Germany October 15, 1938

15 Claims. (Cl. 196—78)

This invention relates to the production of polymerization and condensation products from chlorinated hydrocarbons. More particularly, the invention is concerned with the manufacture of lubricating oils of high viscosity index from chlorinated hydrocarbons by means of catalysts.

Catalysts have been used heretofore for polymerization and condensation reactions. It is known in the art, for example, that chlorinated paraffin hydrocarbons may be polymerized by means of aluminum chloride whereby products of high molecular weight are obtained. By reacting chlorinated paraffin wax alone, or in mixture with aromatic hydrocarbons, with aluminum chloride, lubricating oils of high quality have been produced. Sometimes aluminum chloride and similar catalysts have also been used in the presence of small amounts of metals such as aluminum and copper.

In carrying out these processes of the prior art, certain drawbacks have been observed and this invention discloses a novel method by which the disadvantages and difficulties of the older processes are either avoided or overcome. Aluminum chloride is perhaps the best known catalyst for performing the polymerization and condensation reactions herein referred to. The great disadvantage of this and other catalysts consists in that they do not permit of performing the process by a continuous method of operation. In the practice commonly used, aluminum chloride and other catalysts, either alone or in mixture with each other or with metals or metal oxides, are thoroughly mixed with the chlorinated hydrocarbons and are allowed to react at the desired temperature. After the reaction is completed, in which varying amounts of sludge are formed, the polymerized products are separated from the sludge. It will thus be seen that, in the methods heretofore used, the catalysts have been employed in batch treatment. All attempts to use these catalysts in a continuously operating method have failed partly because of the lack of mechanical strength of the catalysts and partly because of the large amounts of tarry products which form during the reaction and which cover the catalyst and make it impossible for the catalyst to function over a long period of time.

I have discovered a novel process in which chlorinated hydrocarbons are continuously passed over a bed of solid catalyst at elevated temperatures under conditions making it possible to maintain the effectiveness of the catalyst substantially undiminished for a long period of treatment. For this purpose, liquid or solid hydrocarbons—e. g. wax—of comparatively low molecular weight are first treated with chlorine whereupon the chlorinated hydrocarbons are exposed in a reaction vessel to one or more catalytically acting substances at suitable temperatures. The action of the catalysts consists in splitting off hydrogen chloride and in forming hydrocarbons of greater molecular weight. In addition a molecular rearrangement takes place.

In carrying out the process I may use the chlorination product of liquid hydrocarbons or of solid hydrocarbons, such as paraffin wax, either separately or in admixture with each other; and these chlorinated hydrocarbons may be brought in contact with the catalyst directly; or they may first be dissolved in a diluent, which is substantially free of aromatic hydrocarbons, whereafter the solution is contacted with the catalyst. For example, the saturated portion of a kerosene is a very suitable diluent, but others may likewise be used.

I have observed that aluminum carbide, $Al_4C_3$, is a very effective catalyst for performing my continuous process of polymerizing and condensing chlorinated hydrocarbon mixtures. Aluminum carbide possesses sufficient mechanical strength and its catalytic effect in my process is practically unlimited. I may use aluminum carbide alone, as catalyst, or I may employ it in the presence of small amounts of aluminum and copper and/or iron, which is the preferred method. Generally I have found that 1% of aluminum and ½% of copper, based on the amount of aluminum carbide, are sufficient but larger or smaller amounts may be employed depending upon the type of chlorinated hydrocarbons which are being treated, upon the temperature at which the reaction is performed and upon the characteristics of the products desired.

It is, therefore, an object of my invention to provide a continuous process by which chlorinated hydrocarbons, in the presence or in the absence of an aromatic-free diluent, are polymerized and condensed in the presence of aluminum carbide alone or in mixture with small amounts of metals such as aluminum, copper and iron. It is a further object of this invention to produce lubricating oils of high viscosity index by a continuous process as described.

In carrying out my process, a hydrocarbon mixture is first treated with chlorine until it contains from 15 to 25% of the halogen. I prefer to use wax as this product is available in large quantities as a by-product of the oil industry but it is to be understood that my process is not limited thereto and that also other, normally liquid hydrocarbons may be used. The chlorinated hydrocarbon mixture is then—either directly or after having been dissolved in an aromatic-free diluent such as refined kerosene—passed through a tower which contains a layer of aluminum carbide and small amounts of aluminum and copper and/or iron as already described. The tower is provided with suitable means for heating it and the temperature inside the tower and in the layer of catalysts is held between 265° F. and about 375° F. In many cases temperatures of from 330 to 350° F. were found to give the best results. The reaction proceeds under normal pressure by splitting off hydrochloric acid vapor most of which leaves the tower at the top. The reaction products are withdrawn from the bottom of the tower and they are purified by treatment with clay to remove sludge or tarry products which may have formed during the catalytic reaction. Thereafter the clay treated oil is neutralized with caustic solution and freed from the diluent (kerosene) by distillation. If chlorinated wax is processed, the finished product will contain varying amounts of surplus wax and this may be removed by any of the known dewaxing processes either after or preferably before removal of the diluent.

My process is also suitable for condensing mixtures of chlorinated hydrocarbons with aromatic hydrocarbons, such as benzol, naphthaline and their homologues. If such condensation is to be effected, a mixture of chlorinated hydrocarbons and aromatic substances, or liquids containing same such as extracts obtained from the extraction of hydrocarbon oils with selective solvents, is passed through the tower containing the catalyst.

In the continuous process herein described it is sometimes advantageous to pass through the tower containing the catalyst, a stream of hydrochloric acid vapors, nitrogen or gases containing same, before or during the polymerizing or condensing process, as illustrated in the accompanying drawings.

In the drawings, Fig. 1 illustrates the operation of my process in a single stage unit, and Fig. 2 illustrates its operation in a two stage unit. Referring to Fig. 1, the chlorinated hydrocarbons are taken from the storage tank 1 by means of pump 2 and forced to travel through pipe 3. The solvent to be used as diluent, and which may be stored in tank 4, is forced into the stream of chlorinated hydrocarbons by pump 5. The mixture passes through the heat exchanger 6, in which heat from the reaction products is taken up by the products about to undergo treatment.

The chlorinated hydrocarbons and the solvent enter from the top of the catalyst tower 7 and pass through the bed of solid catalyst. The temperature of the tower is controlled by a suitable jacket which is not shown and which is adapted for heating. The hydrogen chloride vapors formed leave the tower by way of pipe 9. The tower is also provided with a valved opening 8 at the top for the addition of catalyst during operation and with an opening close to the bottom by which gases such as nitrogen and hydrogen chloride from pipe 10 can be added.

The liquid products leaving the reaction tower through pipe 11 are withdrawn by pump 12. They enter the tar separator 13 from which the tar is sent to storage tank 19 by pipe 17 and pump 18. The polymerization and condensation products as well as the solvent pass through pipe 14, heat exchanger 6 and cooler 15 to storage tank 16.

The operation of a two stage unit is shown in the drawings Figure 2. A mixture of chlorinated paraffin wax and kerosene is taken from tank 31. Having passed pipe 32, it enters the first catalyst tower 33 and comes in contact with the solid catalyst. Hydrogen chloride is formed and is sent to the gas holder 35 by way of pipe 34. The liquid products leaving through pipe 37 enter the tar settler 38. After removal of the tar they are charged to the second catalyst tower 42 by way of pipe 41. Hydrogen chloride leaves this tower by pipe 43. The liquid products removed from the second tower by way of pipe 45 are purified from the tar in the tar separator 46 and are sent to the storage tank 49 by way of pipe 48.

The towers are provided with pipes 36 and 44 for the introduction of gases such as nitrogen and hydrogen chloride, and with valved openings 51 and 52 at the top of each for the addition of catalyst during operation if desired.

The tar collected in the separators 38 and 46 is taken to storage tank 40 by way of pipes 39 and 47. Pipe 50 serves for the recirculation of part of the tar to the catalyst tower 33 if so desired.

A pump 53 is provided for recirculating tar through pipe 50 for retreatment in the first tower 33, and a valve 54 is provided in pipe 39 for shutting off the flow of tar as desired. A pump 55 is provided in the pipe 41 for lifting the partly polymerized products from the tar separator 38 to the top of the second tower for further treatment.

The catalyst metals are preferably added in finely divided solid condition, and may be suspended in oil. The hydrochloric acid gas evolved is not sufficient in volume and pressure to prevent the introduction of the catalyst metal through the valved openings 8, 51 and 52 as desired.

The following example will further illustrate my process and it is to be understood that the procedure shown by the example is merely indicative and that the operating conditions and the type of oil to be processed may be varied as has been described herein. Experiments have been carried out over periods as long as 500 hours and more without a decrease of the efficiency of the aluminum carbide.

Example I

One volume of a chlorinated paraffin containing 19.4 weight per cent of chlorine, and obtained from a paraffin wax of 125° F. melting point was dissolved in three volumes of a kerosene which was substantially free of aromatics. Thereupon the solution was passed continuously downward in a reaction tower, which was filled with aluminum carbide, containing 1 wt. per cent of aluminum and ½ wt. per cent of copper. The temperature in the reaction vessel was kept constant between 300 and 310° F. The reaction products were continuously withdrawn from the bottom of the tower.

The effect of the catalyst can best be followed by determining the chlorine content of the reaction products which leave the tower at the bottom. After the 1st, 70th, 90th and 95th hour the chlorine contents of the discharge were found to be 0.1, 0.04, 0.04 and 0.03 wt. per cent respectively, which shows that the effectiveness of the aluminum carbide after this time had not decreased.

The reaction products were treated with clay to remove a small amount of tar or sludge which is formed in the process. Thereafter the oil was washed with alkali and water, following which the diluent was removed by distillation. Oils thus obtained still contained an average of approximately 19 wt. per cent of original paraffin, which did not participate in the reaction. This paraffin was separated from the oil by dewaxing. The following table gives the properties of the finished lubricating oils obtained in accordance with the above description, after the experiment had proceeded for 5, 70, 90 and 95 hours respectively:

|  | Hours | | | |
| --- | --- | --- | --- | --- |
|  | 5 | 70 | 90 | 95 |
| Sayb. vis. at 100° F | 234 | 260 | 285 | 261 |
| Sayb. vis. at 210° F | 51.7 | 54.2 | 55.4 | 53.1 |
| Viscosity index | 125 | 127 | 122 | 120 |

It will be seen from this example that the obtained synthetic oils represent lubricating oils with very high viscosity indices.

The time of contact between the catalyst and the chlorinated hydrocarbon mixture may be varied by increasing or decreasing the speed with which the latter is charged to the reaction tower. Likewise the amount of catalyst may be increased or decreased depending upon whether a longer or shorter time of contact is desired. Instead of using only one catalytic tower as illustrated in the above example, a series of two or more reaction towers may be used in carrying out the process. It is a special feature of my invention that especially valuable synthetic oils are produced by carrying out my process in two or more stages. I have found that most of the chlorine is readily removed from the chlorinated product whereas more drastic means must be applied for the removal of the last traces.

I, therefore, prefer to carry out my process in two stages. In the first catalytic tower conditions are so adjusted that about 75 to 95 wt. per cent of the chlorine are removed, the reaction mixture then being sent to the second tower in which the rest of the chlorine is split off by using a more active catalyst, a higher reaction temperature or a longer reaction period.

In carrying out this two-stage process the first reaction tower may be filled with a mixture of aluminum carbide and iron or copper whereas aluminum is admixed to the carbide in the second tower. I may also use the same catalyst or catalyst mixture in both towers, applying only a higher temperature and/or a longer reaction period in the second tower.

The following example will show that especially good results are obtained by carrying out my process in two stages as described.

Example II

Two iron tubes were heated to a temperature of 340° F. by means of an electrical heating device, the first tube was filled with aluminum carbide containing 5 wt. per cent iron and 1 wt. per cent of copper, and the second vessel contained a mixture of aluminum carbide and 5 wt. per cent of aluminum plus 1 wt. per cent of copper. A chlorinated paraffin containing 19.5 wt. per cent of chlorine was diluted with refined kerosene and pumped through the reaction vessels, whereby 89% of the chlorine were removed in the first tower.

The dechlorinated reaction product was treated with clay, distilled and dewaxed. The dewaxed oil had the following characteristics:

| A. P. I.-gravity | 30.2 |
| --- | --- |
| Sayb. vis. at 100° F | 559 |
| Sayb. vis. at 210° F | 71.7 |
| Viscosity index | 112 |
| Pour point °F | −8 |

In carrying out this continuous condensation process it may occur that a certain amount of the aluminum and copper or other metal which is used in addition to the aluminum carbide, is removed from the bed of catalyst and is carried out of the reaction zone with the polymerized products. It is obvious that these metals must be replaced by new portions of aluminum, copper or iron as the case may be, which will be introduced into the reaction zone during the operation.

As described above, aluminum carbide when used by itself is an effective catalyst for condensing chlorinated hydrocarbons. However, a much more pronounced catalytic action takes place, and lubricating oils of higher viscosity index are obtained, if from ½ to about 2% aluminum and copper are added to the aluminum carbide. In comparative experiments I have ascertained that such metals as aluminum, copper or iron, and mixtures thereof alone, do not polymerize or condense chlorinated hydrocarbons in the absence of aluminum carbide. Thus it appears that the aluminum carbide in my process not only functions as a catalyst which promotes the condensation reaction but also as an activator for the added metals. These metals seem to exert a certain catalytic effect by themselves provided they are activated as, for example, by aluminum carbide.

While I have described my process in detail and have disclosed several methods of and forms of apparatus for performing it, I desire it to be understood that this invention is not restricted to any specific example or any theory given herein and that no limitations may be applied hereto other than those indicated by the claims.

For reasons of brevity, I refer in some of the claims to a solid catalyst comprising principally aluminum carbide and thereby mean a catalyst which contains from 97.0 to 99.8 per cent by weight of aluminum carbide, the other ingredients being from 0.1 to 2 per cent by weight of aluminum metal and from 0.1 to 1.0 per cent by weight of copper or iron or both.

I claim:

1. A continuous process of polymerizing and condensing a partly chlorinated hydrocarbon mixture, comprising passing said partly chlorinated hydrocarbon mixture in liquid phase at an elevated temperature over a catalyst substantially consisting of aluminum carbide, whereby hydrochloric acid vapors are split off and a hydrocarbon substance of increased molecular weight is formed.

2. A continuous process of polymerizing and condensing a mixture of chlorinated hydrocarbons and aromatic hydrocarbons, comprising passing said mixture in liquid phase at an elevated temperature over a catalyst substantially consisting of aluminum carbide, whereby hydrochloric acid vapors are split off and a hydrocarbon substance of increased molecular weight is formed.

3. A continuous process of polymerizing and condensing a partly chlorinated hydrocarbon mixture, comprising passing said partly chlorinated hydrocarbon mixture in liquid phase at an elevated temperature over a solid catalyst comprising principally aluminum carbide, whereby hydrochloric acid vapors are split off and a hydrocarbon substance of increased molecular weight is formed.

4. A continuous process of polymerizing and condensing a mixture of chlorinated hydrocarbons and aromatic hydrocarbons, comprising passing said mixture in liquid phase at an elevated temperature over a solid catalyst comprising principally aluminum carbide, whereby hydrochloric acid vapors are split off and a hydrocarbon substance of increased molecular weight is formed.

5. A continuous process according to claim 1 in which the partly chlorinated hydrocarbon mixture is dissolved in a substantially aromatic-free diluent prior to passing it over the catalyst, followed by conducting away the resultant hydrocarbon substance of increased molecular weight and removing the diluent therefrom.

6. A continuous process according to claim 2, in which the mixture of chlorinated hydrocarbons and aromatic hydrocarbons is dissolved in a substantially aromatic-free diluent prior to passing it over the catalyst.

7. A continuous process of polymerizing and condensing a mixture of chlorinated hydrocarbons and an extract containing aromatic substances obtained by selective solvent extraction of a hydrocarbon oil, comprising passing said mixture in liquid phase at an elevated temperature over a solid catalyst comprising principally aluminum carbide, whereby hydrochloric acid vapors are split off and a hydrocarbon substance of increased molecular weight is formed.

8. A continuous process of polymerizing and condensing a mixture of chlorinated hydrocarbons and an extract containing aromatic substances obtained by selective solvent extraction of a hydrocarbon oil, comprising dissolving said mixture in a hydrocarbon diluent, passing the solution in liquid phase at an elevated temperature over a solid catalyst comprising principally aluminum carbide, whereby a hydrocarbon substance of increased molecular weight is formed, and removing the diluent therefrom.

9. A continuous process of polymerizing and condensing a chlorinated paraffin wax, comprising dissolving said chlorinated paraffin wax in a diluent, passing the solution at temperatures between 265 and 375° F. over a solid catalyst comprising principally aluminum carbide, whereby hydrogen chloride is split off, producing a viscous hydrocarbon oil of high molecular weight and recovering the valuable lubricating oil formed.

10. A continuous method of producing lubricating oils of higher molecular weight from lubricating oils of lower molecular weight, comprising chlorinating said lubricating oil of lower molecular weight and passing the chlorinated products, dissolved in a diluent, at elevated temperatures over a solid catalyst comprising principally aluminum carbide, whereby hydrogen chloride is removed, and recovering the lubricating oil formed.

11. A continuous method of polymerizing and condensing hydrocarbon products comprising chlorinating hydrocarbons such as paraffin wax and paraffinic hydrocarbon oils, passing the chlorinated products to which aromatic hydrocarbons are added and which are dissolved in a nonreacting solvent at temperatures between 265 and 375° F. over a solid catalyst comprising principally aluminum carbide, thereby removing the chlorine in the form of hydrogen chloride, introducing metals having condensing catalytic action during the operation and recovering the valuable lubricating oils from the products produced.

12. A continuous method of polymerization and condensation, comprising chlorinating hydrocarbon products such as a paraffin wax and paraffinic hydrocarbon oils, passing the chlorinated products to which cyclic hydrocarbons are added, after dissolving them in a nonreacting diluent, at temperatures between 310 and 350° F. over a catalyst consisting of aluminum carbide to which small amounts of metals having condensing catalytic action are added, thereby removing the chlorine in the form of hydrogen chloride, and recovering the valuable lubricating oils from the products produced.

13. A continuous process of polymerizing and condensing halogenated hydrocarbons by means of a catalyst substantially consisting of aluminum carbide, the process comprising several reaction stages, removing a part of the halogen in each stage until products free of halogen are obtained.

14. A continuous method of polymerizing and condensing chlorinated hydrocarbons, after the addition of cyclic hydrocarbons and a nonreacting diluent, by means of a catalyst substantially consisting of aluminum carbide, the process consisting of a first stage, in which up to 95% of the chlorine are removed and a second stage in which the remaining part of the chlorine is removed.

15. A continuous method of polymerizing and condensing hydrocarbon products comprising chlorinating hydrocarbons such as paraffin wax and hydrocarbon oils, passing the chlorinated hydrocarbons to which cyclic hydrocarbons and a nonreacting diluent have been added at temperatures between 265 and 375° F. over a solid catalyst comprising principallly aluminum carbide in a first reaction zone thereby removing up to 95% of the chlorine, contacting the resulting products with a similar catalyst in a second reaction zone under conditions to remove the last part of the chlorine, introducing metals having condensing catalytic action into each reaction zone during the operation and recovering the valuable lubricating oils from the products produced.

ERICH STEFFEN.